US010997258B2

United States Patent
Chen et al.

(10) Patent No.: US 10,997,258 B2
(45) Date of Patent: May 4, 2021

(54) BOT NETWORKS

(71) Applicant: FUJITSU LIMITED, Kawasaki (JP)

(72) Inventors: Wei-Peng Chen, Fremont, CA (US); Lei Liu, San Jose, CA (US); Mehdi Bahrami, San Jose, CA (US); Samir Parikh, San Jose, CA (US); Junhee Park, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 215 days.

(21) Appl. No.: 15/908,596

(22) Filed: Feb. 28, 2018

(65) Prior Publication Data

US 2019/0266287 A1    Aug. 29, 2019

(51) Int. Cl.
*G06F 16/9535* (2019.01)
*G06F 9/54* (2006.01)

(52) U.S. Cl.
CPC .......... *G06F 16/9535* (2019.01); *G06F 9/547* (2013.01)

(58) Field of Classification Search
None
See application file for complete search history.

(56) References Cited

U.S. PATENT DOCUMENTS

| | | | |
|---|---|---|---|
| 5,990,887 A | 11/1999 | Redpath et al. | |
| 7,505,892 B2 | 3/2009 | Foderaro | |
| 8,271,600 B2 | 9/2012 | Herold et al. | |
| 8,352,873 B2 | 1/2013 | Craig et al. | |
| 2014/0229725 A1* | 8/2014 | Migliori | G06F 9/4416 713/2 |
| 2017/0351989 A1* | 12/2017 | Langdon | G06Q 10/06315 |
| 2018/0075335 A1* | 3/2018 | Braz | G06F 16/24522 |
| 2018/0102989 A1* | 4/2018 | Borsutsky | H04L 51/02 |
| 2018/0150524 A1* | 5/2018 | Anger | G06F 16/9535 |
| 2018/0181558 A1* | 6/2018 | Emery | H04M 3/4936 |
| 2018/0300399 A1* | 10/2018 | Blandin | G06N 5/022 |
| 2018/0302345 A1* | 10/2018 | Landowski | H04L 51/02 |
| 2018/0365294 A1* | 12/2018 | Cho | G06N 5/022 |
| 2018/0367484 A1* | 12/2018 | Rodriguez | G06Q 10/101 |
| 2019/0012390 A1* | 1/2019 | Nishant | G06N 20/00 |
| 2019/0066694 A1* | 2/2019 | Hirzel | G10L 15/22 |
| 2019/0207875 A1* | 7/2019 | Youssefi | G06F 16/951 |

OTHER PUBLICATIONS

Dmitry Persiyanov, Chatbots with Machine Learning: Building Neural Conversational Agents, Sep. 12, 2017, https://blog.statsbot.co/chatbots-machine-learning-e83698b1a91e.*
U.S. Appl. No. 15/374,798, filed Dec. 9, 2016.
Zhang, Xiang, LeCun Yann, "Text Understanding from Scratch", arXiv preprint arXiv:1502.01710, Apr. 4, 2016.

* cited by examiner

Primary Examiner — Mark D Featherstone
Assistant Examiner — Samuel C Sharpless, III
(74) Attorney, Agent, or Firm — Maschoff Brennan (57) ABSTRACT

A bot network system may be provided. A system may include a plurality of bot agents, wherein at least one bot agent of the plurality of bot agents is configured to receive a request from a user in natural language. The system may further include a plurality of digital resources including one or more of a software program, a service, a web service and a dataset. Each digital resource of the plurality of digital resources may be configured to communicate with a dedicated bot agent of the plurality of bot agents. Also, each bot agent may be configured to interact with its associated digital resource via an application programming interface (API) of the associated digital resource and translate between the natural language and a language of the associated digital resource.

17 Claims, 10 Drawing Sheets

BOT NETWORKS

FIELD

The embodiments discussed herein relate to bot networks.

BACKGROUND

An Internet Protocol (IP) network is a communication network for sending and receiving messages between one or more computers. Human users may interact with digital resources of an IP network via a webpage or mobile application.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a bot network system. The system may include a plurality of bot agents, wherein at least one bot agent of the plurality of bot agents is configured to receive a request from a user in natural language. The system may further include a plurality of digital resources including one or more of a software program, a service, a web service, and a dataset. Each digital resource of the plurality of digital resources may be configured to communicate with a dedicated bot agent of the plurality of bot agents. Further, each bot agent may be configured to interact with its associated digital resource via an application programming interface (API) of the associated digital resource and translate between the natural language and a language of the associated digital resource.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments disclosed herein relate to bot networks, and more specifically to information centric networking (ICN) networks including distributed bots. Further, various embodiments may relate to ICN interfaces (also referred to herein as "chatbot-ready interfaces" or "bot agents") that may enable entities (e.g., human/programmers, software programs, and/or bots) to interact with digital resources (e.g., software programs, datasets, open source, etc.). For example, one or more digital resources (e.g., each digital resource in a network) may be associated with and/or may include an ICN interface. In some embodiments, the interfaces may be configured for "speaking" "natural language."

Conventionally, a digital resource in a network may be identified by its IP address. Further, a human user may interact with a digital resource through a web page or mobile application. Digital resources may also have well-defined interfaces, such as APIs, and others (e.g., human users) may need to follow a defined interface to interact with a digital resource. Moreover, to access data sets stored in a database, human users may need to send a query message (e.g. SQL) to the database to look up the requested information.

In conventional networks, specifications (e.g., API documentations) may exist for software developers to understand the usage of a well-defined interface. Although well-defined interfaces like APIs may provide an easy programming tool to access digital resources, it is non-trivial to quickly interact with a digital resource.

Various embodiments may include an artificial intelligence (AI) based ICN network including one or more distributed bot agents (e.g., a "bot network"). In various embodiments, a bot agent may be dedicated interface for a digital resource and may be a representative of the digital resource. According to some embodiments, machine learning techniques may be used to learn functionalities of a digital resource. Further, in at least some embodiments, bot agents may be configured to translate between natural language and the APIs of a digital resource. Accordingly, various embodiments may relate to a network of intelligent bots configured such that end users (e.g., human users, software programs, bots, etc.) may retrieve information from cyberspace more easily compared to conventional systems.

Thus, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure are now explained with reference to the accompanying drawings.

Figure 1:
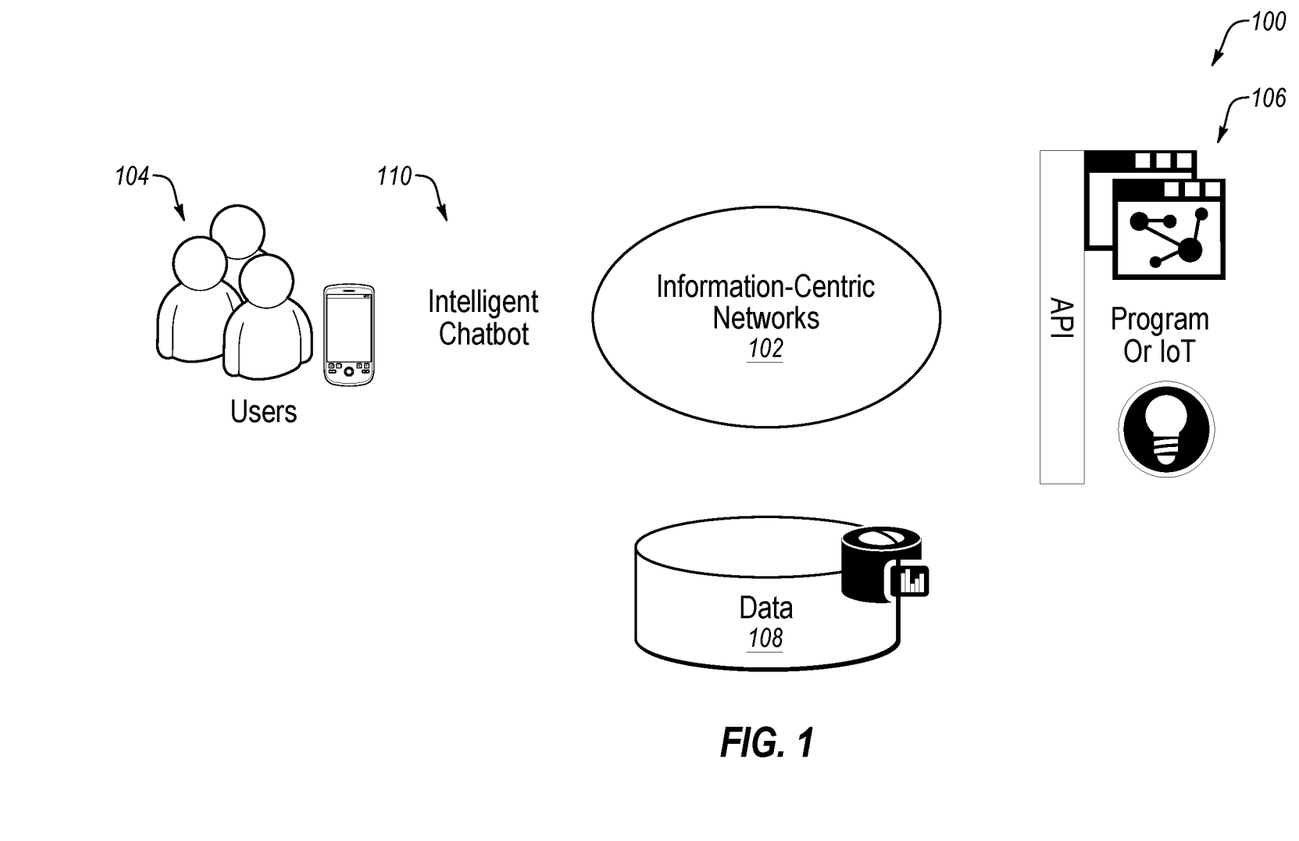
FIG. 1 depicts an example system including an information centric network.

FIG. 1 depicts an example system 100 including an information centric network 102. According to some embodiments, network 102 may include an artificial intelligence (AI) information centric network. System 100 further includes one or more users 104 and one or more digital resources, such as program 106 and dataset 108. For example, program 106 may include one or more electronic devices, software programs, Internet of things (IoT), etc.

According to various embodiments, users 104 may interact with digital resources (e.g., Human-Computer Interaction (HCI)) via one or more bot agents 110 (also referred to herein as "chatbots" or "bots"). In various embodiments, each digital resource may include and/or may be associated with at least one bot agent 110 (also referred to herein as "chatbot-ready" interface or an "ICN interface"). Each bot agent may be configured to speak in a "natural language" to serve as a bridge between a native API of a digital resource and external entities (e.g., software, humans, and/or bots).

Furthermore, dataset 108 may include and/or may be associated with at least one bot agent 110 (e.g., for interaction with external entities). In at least some embodiments, data analytics insight powered by machine learning may be retrieved from dataset 108 and presented to external entities.

Figure 2:
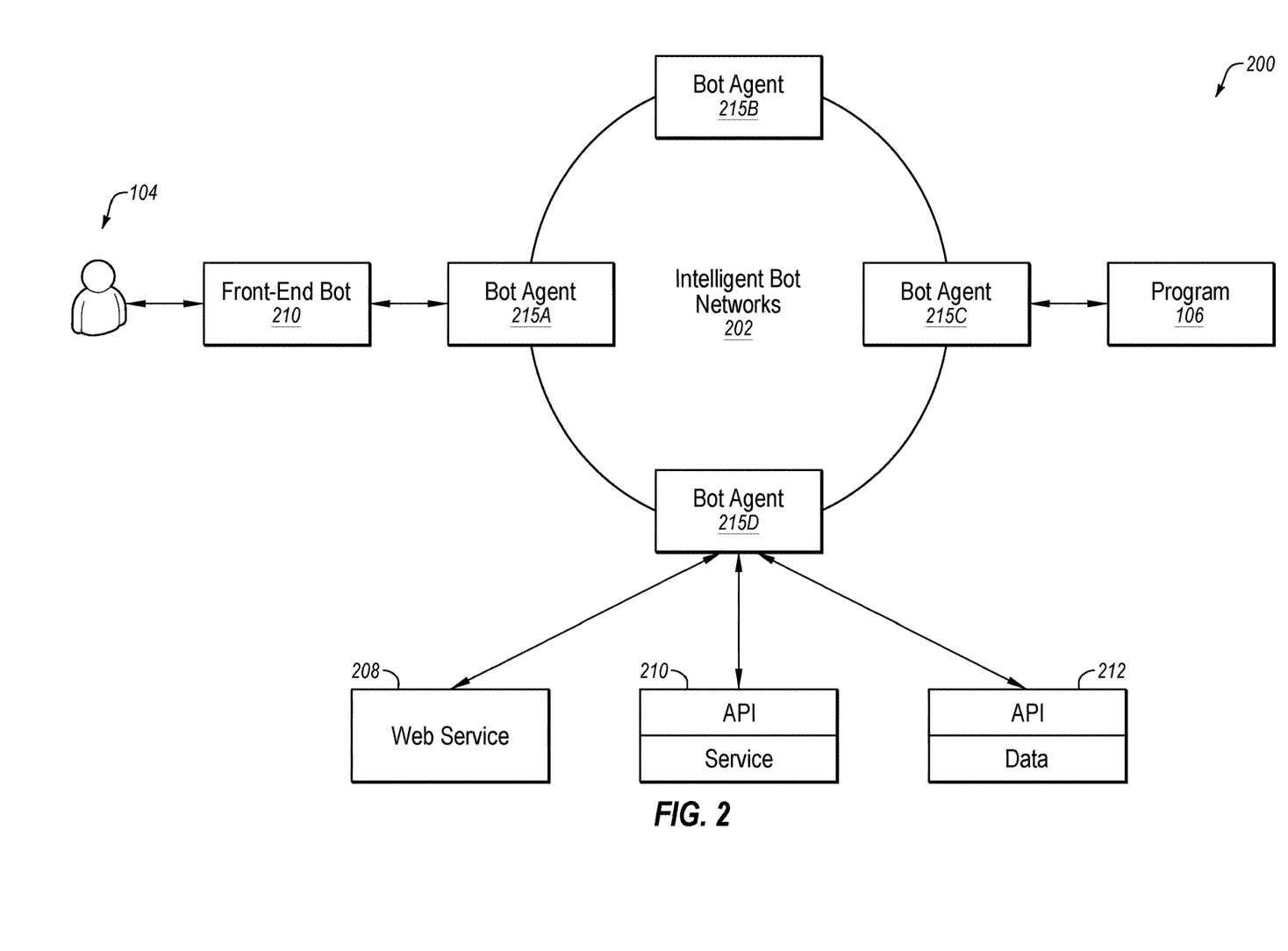
FIG. 2 illustrates an example bot network system including a bot network.

FIG. 2 illustrates an example bot network system 200 including a bot network 202. System 200 further include user 104, programs 106, web services 208, services 210, and data 212. Each of programs 106, web services 208, services 210 and data 212 may be referred to as a "digital resource." Further, system 200 includes a bot 210 (e.g., a "front-end" bot) and a plurality of bot agents 215A-215D. In some embodiments, web service 208 may include one or more hardware devices, which can be programmed through the web service.

According to various embodiments, an interface of each digital resource may be configured to understand a request in natural language (e.g., a human language) and communicate with a digital resource accordingly. More specifically, a bot agent (e.g., bot agents 215A-215D) may translate between natural language and a language of a digital resource (e.g., the APIs of a digital resource). Further, in some embodiments, conventional interfaces (e.g., web interfaces, APIs) may exist. For example, a chatbot may be added to a "Weather Channel" web service or "wunderground" API. Additionally or alternatively, a chatbot may understand the content in a web service or API to access the information provided by, for example, the "Weather Channel."

For example, user 104 may submit the following request: "Can you recommend an Italian Restaurant near me and with a price range of $50 per person?" In this example, front-end bot 210 may receive the request in natural language, convey the request to bot agent 215A, which may convey the request to bot agent 215D. Further, bot agent 215D may translate the request from natural language to a language for communication with service 210. More specifically, bot agent 215D may translate the request from the natural language to a language of an API associated with service 210. Further, service 210 may provide answer to bot agent 215D (e.g., via an associated API). Further, bot agent 215D may translate the answer to natural language and the answer may be provided to user 104 (e.g., via bot agents 215D and 215A and front-end bot 210).

In another example, program 106 may submit the following request: "What is the average airfare from Los Angeles to San Francisco?" In this example, bot agent 215C may receive the request in natural language, and convey the request to bot agent 215D. Further, bot agent 215D may translate the request from natural language to a language for communicating with data 212. More specifically, bot agent 215D may translate the request from the natural language to a language of an API associated with data 212. Further, data 212 may provide an answer to bot agent 215D (e.g., via an associated API). Further, bot agent 215D may translate the answer to natural language and the answer may be provided by program 106 (e.g., a video format converter) via bot agents 215D and 215C.

Figure 3:
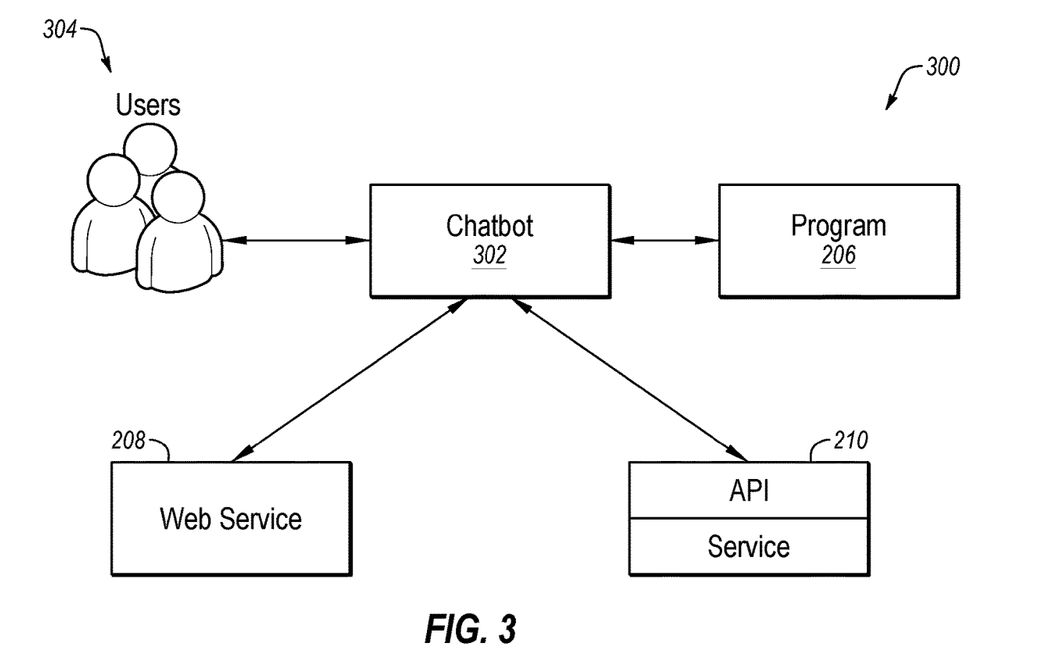
FIG. 3 depicts an example deployment scenario.
Figure 4:
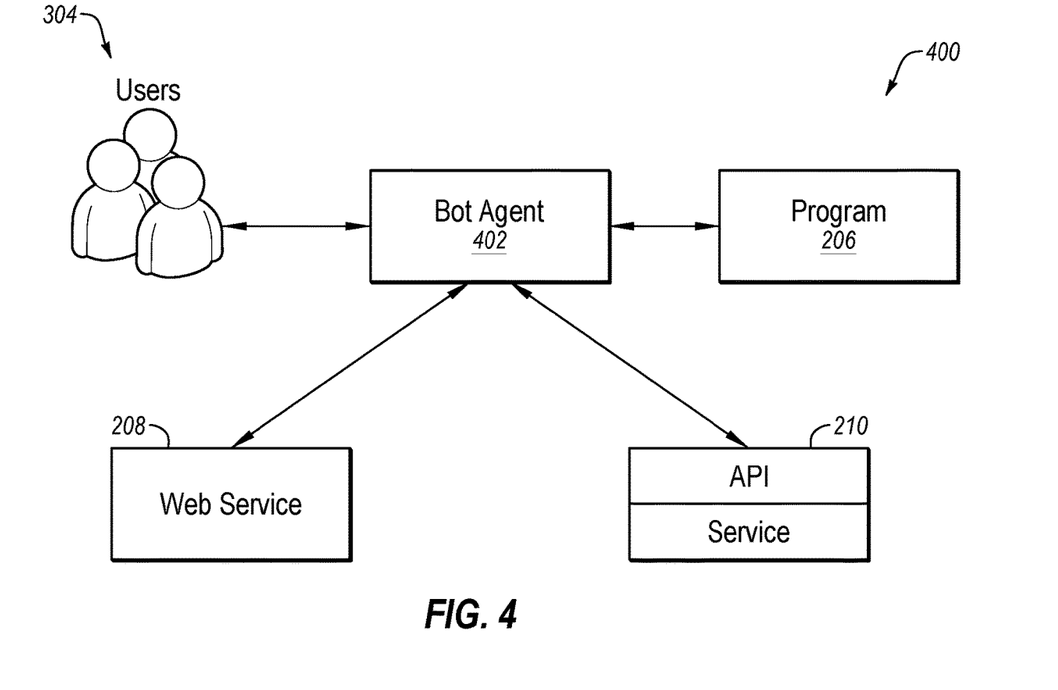
FIG. 4 depicts another example deployment scenario.

FIG. 3 depicts an example deployment scenario 300. In scenario 300, a service provider may provide its own chatbot 302 for, for example, its web service. In another example deployment scenario 400 illustrated in FIG. 4, a bot agent (e.g., created via a $3^{rd}$ party) may be configured to interact with an existing web service or API. In at least some embodiments, different web services may be defined as an API including public databases, IoT devices, network devices (e.g., programmable switches/routers), internal/external software APIs, etc.

Bot agent networks may be considered as one type of broad sense ICN network, wherein communication may be between a human and a bot, as well as between a bot and another bot. In some embodiments, communication (e.g., a conversations) may be annotated and exchanged between different bot agents to search for a desired service, as requested by an end user.

For example, an ICN network (e.g., bot network 202) may be used for communicating amongst different bot agents (e.g., to answer a user's query). In some embodiments, qualified bot agents may be identified, agent chaining may be determined, and/or information (e.g., state and/or other information) may be exchanged between bots agents within the network.

For example, a bot agent may identify one or more candidate bot agents (e.g., "qualified bot agents") (e.g., bot agents that may provide answers and/or solutions to the user's query) via an ICN network. More specifically, for example, bot agent information (e.g., bot agent names, capabilities of the bot agents, etc.) may be used to identify the one or more candidate bot agents for performing a request (e.g., a requested service) and/or providing information (e.g., in response to a user query). According to various embodiments, a name of a bot agent may exist in an application layer. In other embodiments, a name of a bot agent may exist in a networking layer.

Further, for example, a bot agent may identify agent chaining (e.g., service chain) via the ICN network. For example, with reference again to FIG. 2, in response to a natural language query (e.g., from user 104) including "find the movie 'Titanic' in avi format," the query may be sent from bot agent 215A to 215D. Further, the movie "Titanic" may be retrieved from, for example, data 212, the movie may be sent from bot agent 215D to bot agent 215C, the movie may be converted to an avi format via program 106, and the movie may be sent to user 104 via one or more bot agents in network 202.

Moreover, according to various embodiments, bot agents within network 202 may exchange their state/information. For example, information, such as the capability of each bot agent, the state of each agent (e.g., active/inactive, busy/idle, etc.) may be exchanged. In some embodiments, communication for state/information exchange may be performed via an "out-of-band" channel.

Figure 5:
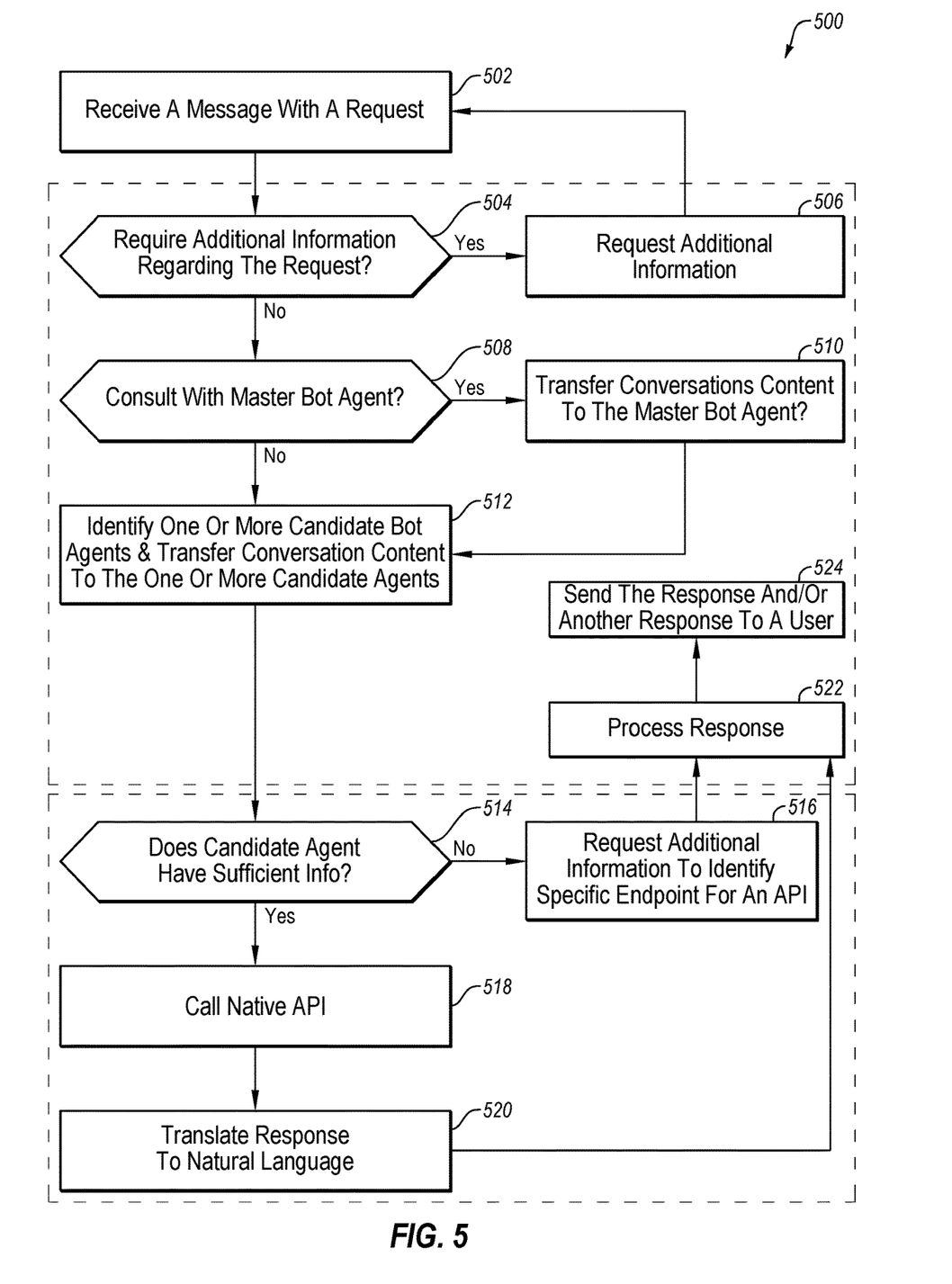
FIG. 5 is a flowchart of another example method of operating a bot network.

FIG. 5 is a flowchart of an example method 500 of operating a bot network, in accordance with at least one embodiment of the present disclosure. Method 500 may be performed by any suitable system, apparatus, or device. For example, a device 1100 of FIG. 11 or one or more of the components thereof may perform one or more of the operations associated with method 500. In these and other embodiments, program instructions stored on a computer readable medium may be executed to perform one or more of the operations of method 500.

At block 502, a request may be received at a bot agent, and method 500 may proceed to block 504. For example, with reference to FIG. 6, a request, which may include a text message (e.g., requesting a service and/or data), may be sent from an end user 602 or another bot (e.g., a front-end bot 604) to bot agent X 606.

With reference again to FIG. 5, at block 504, a determination may be made as to whether the bot agent requires additional information regarding the request. If it is determined that the bot agent requires additional information, method 500 may proceed to block 506. If it is determined that the bot agent does not require additional information, method 500 may proceed to block 508.

At block 506, additional information may be requested, and method 500 may return to block 502. For example, with reference again to FIG. 6, one or more questions may be sent from bot agent X 606 to end user 602 or another bot (e.g., a front-end bot 604) in order to determine a qualified bot agent for the request.

With reference again to FIG. 5, at block 508, a determination may be made as to whether the bot agent should consult with a master bot agent to determine a qualified bot agent for responding to the request. If it is determined that the bot agent should consult with the master bot agent, method 500 may proceed to block 510. If it is determined that the bot agent should not consult with the master bot agent, method 500 may proceed to block 512.

Figure 6:
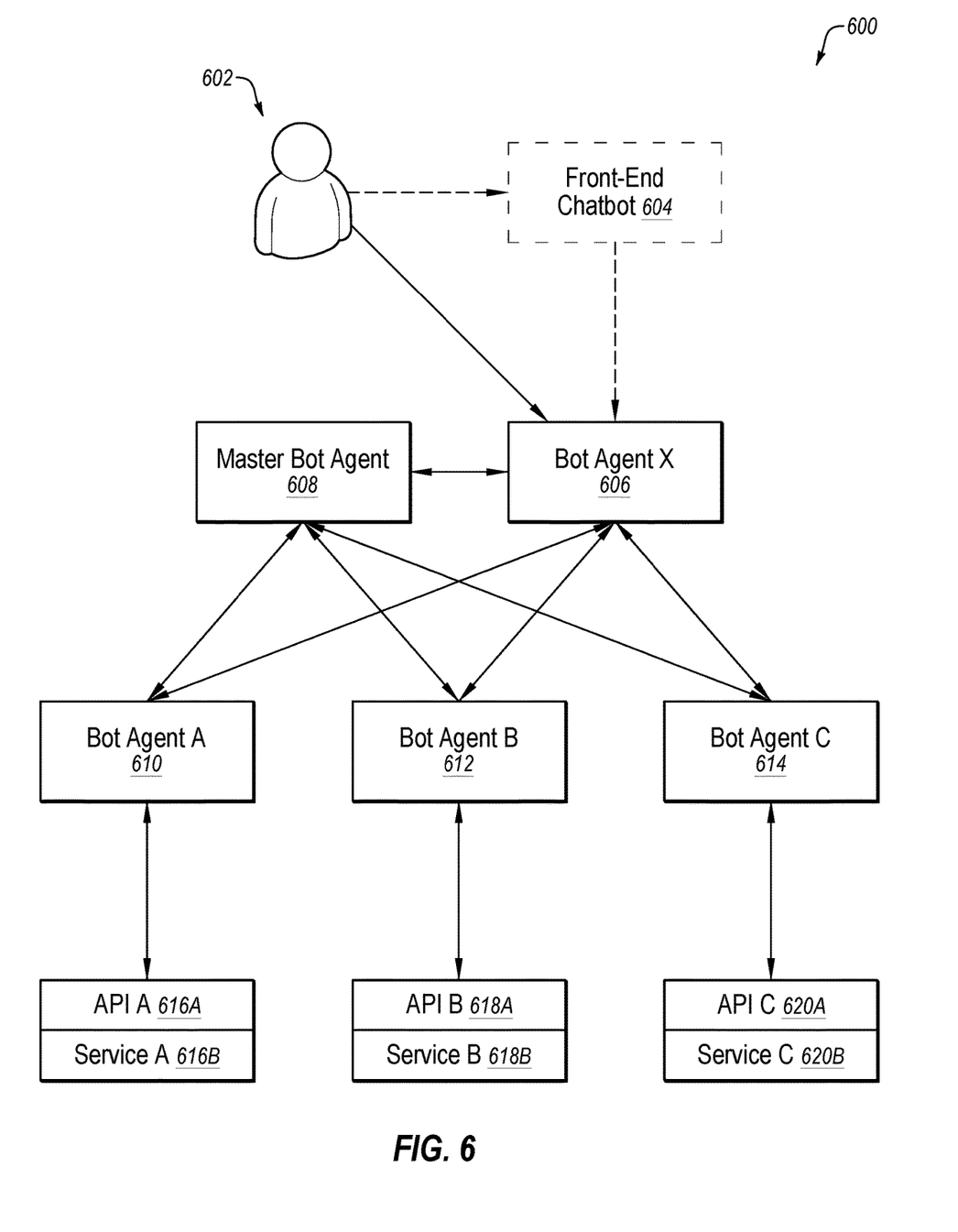
FIG. 6 illustrates an example bot network.

Alternatively, according to at least some embodiments, a network may not include a master bot agent in the network, and bot agents may exchange their capabilities and states via the network, and the bot agent (e.g., bot agent X 606) may determine which one or more bot agents may be candidates for responding to the request.

At block 510, the bot agent may transfer content of the conversation to a master bot agent for assistance, and method 500 may proceed to block 512. For example, with reference again to FIG. 6, bot agent X 606 may transfer the conversation content (e.g., the request (e.g., a text message and/or any additional conversation content) to master bot agent 608.

With reference again to FIG. 5, at block 512, the bot agent may identify one or more bot candidate agents that may support the request, and the bot agent may transfer the conversation content to the one or more candidate (e.g., specialist) bot agents, and method 500 may proceed to block 514. For example, the one or more candidate bot agents may include bot agent A, bot agent B, and/or bot agent C shown in FIG. 6.

For example, conversation content between bot agent X and user (or front-end bot) may include and/or may be used as "routing information" in the context of ICN and may be used to look up a service that a user requested. Further, according to various embodiments, the conversation content may include original content and the content with annotations (e.g., to reduce the processing time at the received bot agents).

In the event the conversation content includes confidential information about the user, the sending bot agent, which may have access to the confidential content, may conceal the sensitive information. For example, the sending bot agent may, for example, replace confidential information by a representative value before transferring the conversation content to another bot agent (e.g., before the receiving bot agent is identified as the truly correct bot agent that the user requested service). When the correct bot agent is identified, the sending bot agent may reveal the sensitive information to the bot agent to complete the request (e.g., service transaction).

For example, according to some embodiments, certain real value data (e.g., a social security number, a password, a bank account number, a credit card number, birthday, address, etc.) may be identified as sensitive or confidential data items. Further, sample values (e.g., synonyms/keywords) may be identified for each real value data item. Moreover, before sending the conversation content to or more other bot agents, the sending bot agent (e.g., bot agent X 606; see FIG. 6) may scan the conversation content and match it with the list of sensitive data items. If there is a match, the sending bot agent may replace the value of the sensitive entity by a sample value, which may be pre-installed at the sending bot agent. In some embodiments, an annotation may be added to avoid confusion with the real value.

In at least some embodiments, for each API (e.g., in a network), a dedicated specialist bot agent may interact with the API. In some embodiments, a bot agent may use machine learning methods to create a model to learn the functionalities of an associated digital resource (e.g. API, dataset, etc.)

One task of a specialist bot agent may include retrieving key attributes of the digital resource via information extraction (e.g., based on a description of an API or metadata of a dataset). Another task of a specialist bot agent may include creating a natural language model of the API and endpoints for the digital resource. For example, API description and end point description may be used as a training model to train a classifier for an API and endpoint of the software, respectively. Similarly, a dataset description and data resource description may be used as training model to train a classifier for an API and endpoint description of a dataset. General classification methods, such as logistic regression, SVM, neural networks, deep learning, CNN, RNN, etc. may be used to train the classifier.

In some embodiments, a training process similar to a training process for determining a bot agent (e.g., blocks 504-512 of FIG. 5) may be used to train one or more models for digital resources. According to some embodiments, an output of a model may be a "Yes" or a "No" for API model and an endpoint for an endpoint model. A source of training material may include previous conversation content that has been verified as valid content (e.g. completion of final transaction with high review score for feedback).

With reference again to FIG. 5, at block 514, a determination may be made as to whether a candidate bot agent has sufficient information regarding the request. If it is determined that the candidate bot agent has sufficient information regarding the request, method 500 may proceed to block 518. If it is determined that the candidate bot agent lacks sufficient information regarding the request, method 500 may proceed to block 516. For example, upon receipt of conversation content from a sending bot agent, a receiving specialist bot agent may run an API and/or an endpoint classifier to determine if the conversation content matches a specific API or endpoint.

At block 516, a request for additional information to identify a specific endpoint for an API may be sent to end user 602 (see FIG. 6) or another bot (e.g., a front-end bot 604; see FIG. 6), and method 500 may proceed to block 522.

For example, if the classification confidence for an API model is high (e.g. exceeding a threshold) while the classification confidence of the top endpoint for endpoint model is low (e.g. below the threshold), the specialist agent may process the received conversation and ask a further clarification question to the sending bot agent.

At block 518, the candidate bot may call the native API for the request and method 500 may proceed to block 520. For example, with reference to FIG. 6, bot agent A may call API A of service A, bot agent B may call API B of service B, and/or bot agent C may call API C of service C.

For example, when the received conversation content includes all the required information to make an API call (e.g., an endpoint call) with values of all the required input parameters, the specialist bot agent may execute the API (endpoint) call with the values of input parameters. In some embodiments, the format of the data provided by user (or sending bot agent) may not be the same as the native format of API and, thus, the data format may be converted, if necessary.

At block 520, a response of an API may be translated to natural language, and method 500 may proceed to block 522. For example, bot agent A may translate a response from API A to natural language, bot agent B may translate a response from API B to natural language, and/or bot agent C may translate a response from API C to natural language.

For example, if the response includes an error code, a message may explain the reason for an error. Further, the specialist bot agent may ask for corrected information and/or additional information from the user. In the case of a successful response, the bot agent may extract the value of one or more output parameters from the received response and replay the "placeholder" in a representative reply message template by the extracted output value. The bot agent may send the reply message back to the sending bot agent.

At block 522, the bot agent may process a response from a bot agent, and method 500 may proceed to block 524. For example, bot agent X may process a response from bot agent A, bot agent B, and/or bot agent C. Since the sending bot agent may send the conversation content to multiple candidate specialist bot agents, the sending bot may receive multiple response messages with additional annotation information such as classification confidence. In some embodiments, upon expiration of a response deadline, the bot agent may process the multiple received responses and determine the best response from the most likely specialist bot agent to support the users' request. For example, the bot agent may select the response with the highest classification confidence.

At block 524, the bot agent (e.g., bot agent X) may send the response and/or another response (e.g., a clarification question) to a user (e.g., end-user 602 of FIG. 6).

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 7:
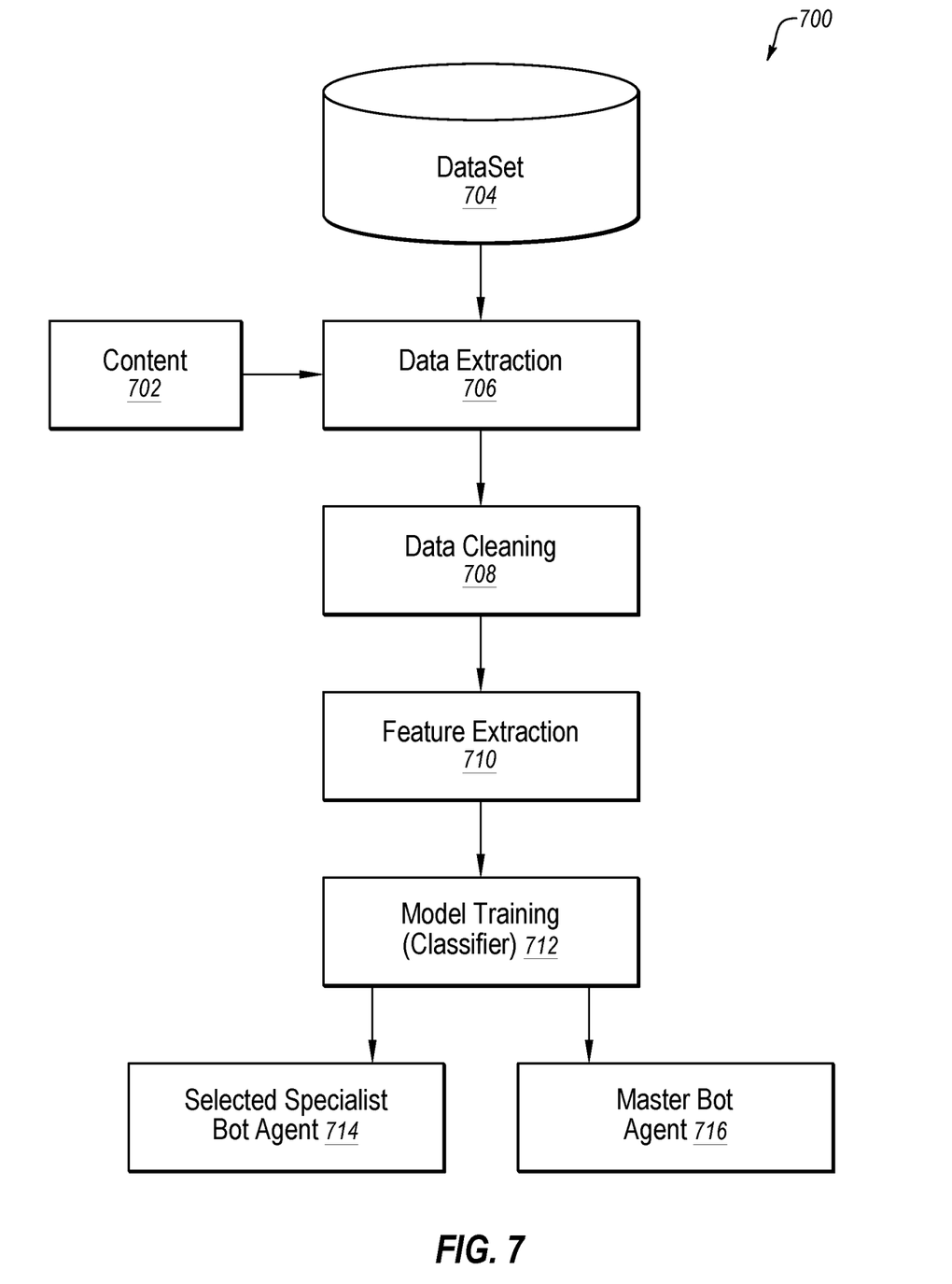
FIG. 7 depicts an example flow that may be used to determine a bot agent for handling a request.

As noted herein, various embodiments may relate to determining a bot agent (e.g., a "specialist bot agent") for handling a request. FIG. 7 depicts an example flow 700 that may be used to determine a bot agent for handling a request, in accordance with one or more embodiments of the present disclosure, is shown. More specifically, flow 700 is related to a training phase of determining a bot agent. In some embodiments, one or more of the operations associated with flow 700 may be performed by network 202. Alternately or additionally, flow 700 may be performed by any suitable system, apparatus, or device. For example, processor 1110 of system 1100 of FIG. 11 may perform one or more of the operations associated with flow 700. Although illustrated with discrete blocks, the steps and operations associated with one or more of the blocks of flow 700 may be divided into additional blocks, combined into fewer blocks, or eliminated, depending on the desired implementation.

At block 706, based on input 702, data from a dataset 704 may be extracted, and flow 700 may proceed to block 708. For example, dataset 704, which may include a description for a service request. More specifically, for example, dataset 704 may include an If This Then That (IFTTT) dataset or similar dataset.

At block 708, the extracted data may be cleaned, and flow 700 may proceed to block 710. For example, in the event the description is not clear (e.g., records with no descriptions, non-English descriptions, single word descriptions, etc.), it may be labeled as, for example, "unclear" and may be included as part of training materials.

At block 710, one or more features may be extracted from the data, and flow 700 may proceed to block 712. At block 712, a model may be trained, and a selected specialist bot agent output 714 and a master bot agent output 716 may be generated.

For example, feature model language modeling and/or feature learning techniques may include, for example, term frequency-inverse document frequency (Tf-Idf), word embeddings, and character embeddings. Further, the classifier may use one or more different algorithms to train a machine-learning model, such as, for example, support vector machines, neural networks, recurrent neural networks, convolutional neural networks, and bidirectional Long Short-Term Memory (Bi-LSTM).

A similar training process may be applied to both a bot agent and a master agent. Some differences may include the amount of the training materials and/or the complexity of training structure. In some embodiments, a classifier may be used as a regular bot agent.

In addition, an output of training model of a master bot agent may include one output (e.g., a selected specialist bot agent or "unclear") while a bot agent may include a plurality of outputs (e.g. a selected specialist bot agent and a selected master agent). For example, if only one master agent exists for a bot agent, an output may include a "0" (e.g., no master bot agent is needed) or a "1" (e.g., the dedicated master bot agent). If multiple master bot agents exist, an output may be a "0" or the ID of the master bot agent. In some embodiments, a relationship between a bot agent and a master bot agent may be hierarchical (e.g., several levels of master bot agents) or mesh (e.g., all master bot agents may be interconnected).

Modifications, additions, or omissions may be made to flow 700 without departing from the scope of the present disclosure. For example, the operations of flow 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

During a training process, instead of outputting an identity of a target specialist bot agent, a classifier may be trained to output a category and/or keywords. A bot agent may then use an output category and/or keywords to search for the target specialist bot agent via, for example, matching the bot agent capabilities with the keywords. In some embodiments, a bot agent may advertise its capabilities to other bot agents. More specifically, as disclosed above, bot agents may exchange state information. In some embodiments, state information, exchanged from one bot agent to another bot agent, may also include chat content (e.g., collected by a bot agent and shared among bot agents.) Exchange of chat content may influence a decision model (e.g., at other bot agents) by providing more training materials.

Figure 8:
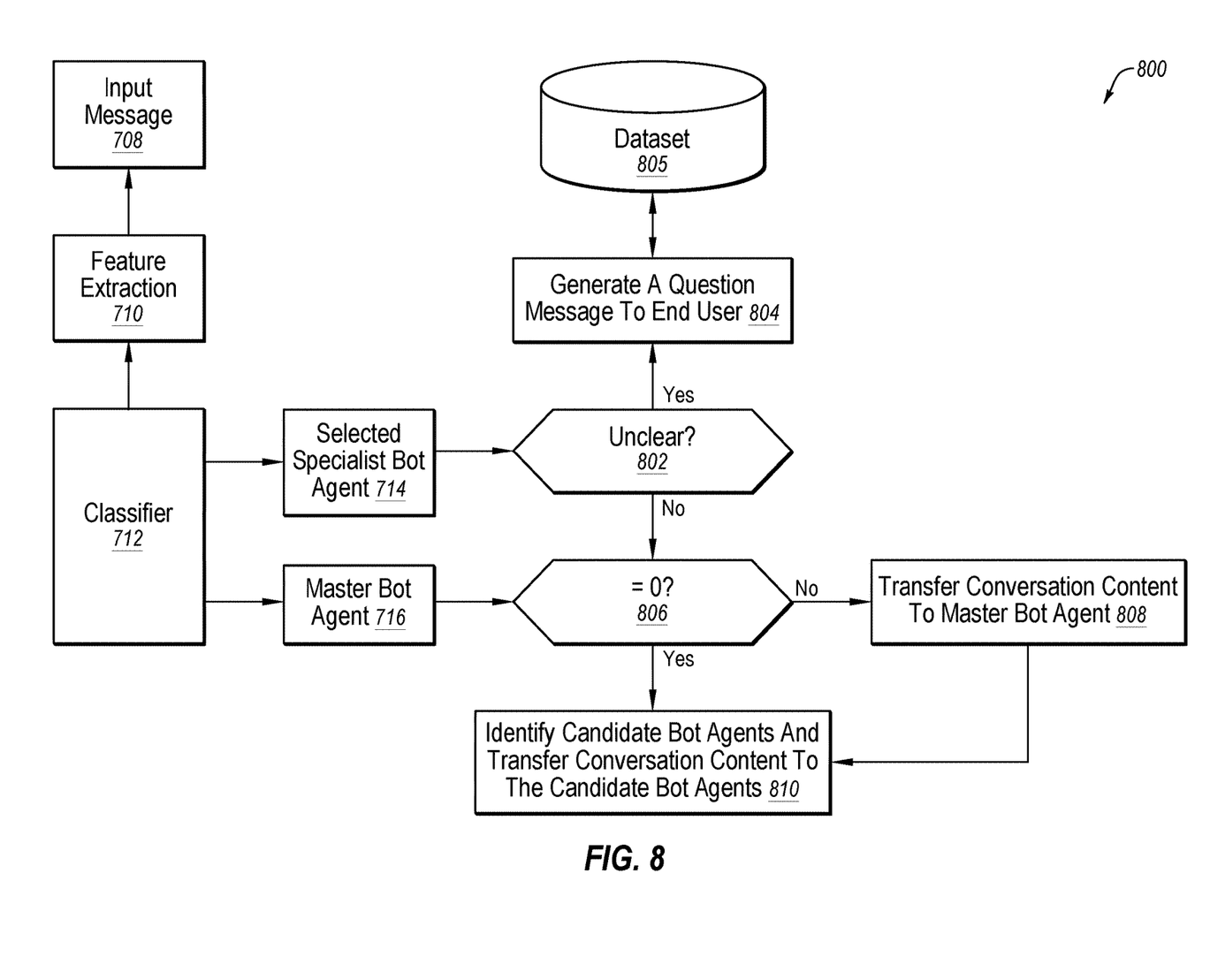
FIG. 8 depicts another example flow that may be used to determine a bot agent for handling a request.

FIG. 8 depicts another example flow 800 that may be used to determine a bot agent for handling a request, in accordance with one or more embodiments of the present disclosure, is shown. More specifically, flow 800 is related to a testing phase of determining a bot agent for handling a request. In some embodiments, one or more of the operations associated with flow 800 may be performed by network 202. Alternately or additionally, flow 800 may be performed by any suitable system, apparatus, or device. For example, processor 1110 of system 1100 of FIG. 11 may perform one or more of the operations associated with flow 800. Although illustrated with discrete blocks, the steps and operations associated with one or more of the blocks of flow 800 may be divided into additional blocks, combined into fewer blocks, or eliminated, depending on the desired implementation.

At block 802, if bot agent output 714 is unclear, flow 800 may proceed to block 804, wherein a question for an end-user may be generated (e.g., based on a dataset 805 of questions). If bot agent output 714 is clear, flow 800 may proceed to block 806

At block 806, if master bot agent output 716 is not equal to zero, flow 800 may proceed to block 808, wherein the conversation content may be transferred to a master bot agent for assistance, and flow 800 may proceed to block 810.

If master bot agent output 716 is equal to zero, or the content conversation has been transferred to the master bot agent, at block 810, the bot agent may determine which one or more bot agents may support the request (e.g., requested data and/or requested service), and the conversation content may be transferred to the one or more bot agents.

Modifications, additions, or omissions may be made to flow 800 without departing from the scope of the present disclosure. For example, the operations of flow 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As disclosed above, a question may be generated and sent to an end-user and/or another bot (e.g., see block 506 of FIG. 5). Further, in some embodiments, if bot agent output 714 is "unclear", a value of classification confidence, which may be an output of classifier, may be checked. When the classification confidence is high (e.g. exceeding a threshold) for "unclear" (and classification confidences for other top N candidates are low), a general clarification question may be generated, such as "I am very sorry. Could you explain a bit more about your request?" Such a question maybe generated from the dataset of question lists (e.g. FAQs) based on the description.

When the classification confidence for the "unclear" class is below a threshold, or the classification confidence of a plurality of top candidates exceeds another threshold, a bot agent may return a list of top candidates as format of buttons to receive quick confirmation from users that the top candidates are the service they request.

Alternatively, if the bot agent output 714 is one of the selected specialist bot agents but its classification confidence is below a threshold, the bot agent may generate a question from the question list based on the description.

For each request (e.g., service request), a model of questions may be generated based on collected data from a previous conversation. The label data may be based on feedback of the end user's user experience. A higher score may represent the question that the bot agent asked users may be treat as ground-truth data for training purpose. Initially (e.g., before the bot agent is running), human labelling data for training purposes may be used. A list of questions may be also generated by the specialist bot agent of the service.

Figure 9:
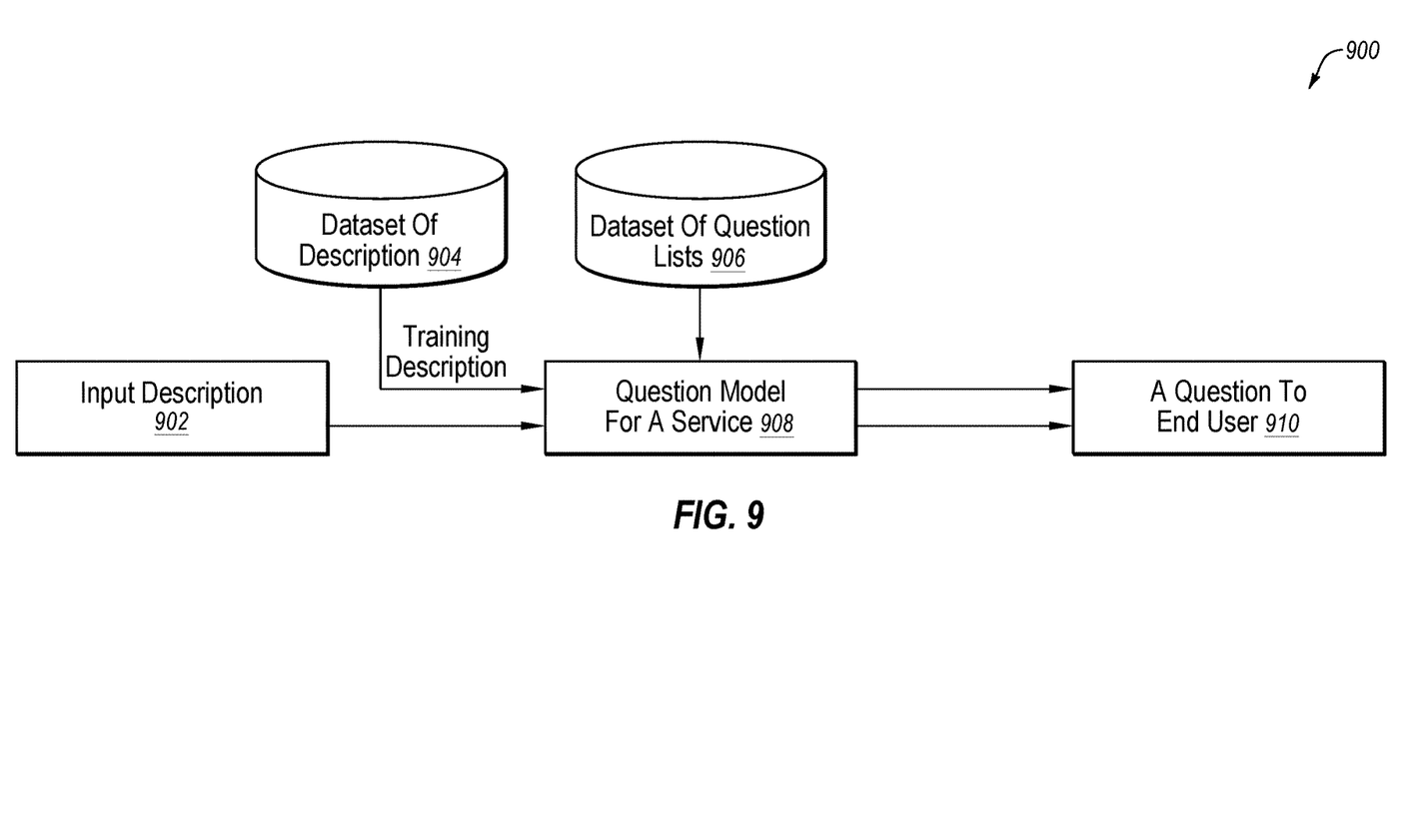
FIG. 9 illustrates an example system.

FIG. 9 depicts a system 900 including an input description 902, a dataset of descriptions 904, a dataset of question lists 906, and a question model 908. In at least some embodiments, based on input description 902, dataset of description 904, and dataset of listed questions 906, question 910, which may be provided to an end-user, may be generated by question model 908.

As disclosed above, a question may be generated and sent to an end-user and/or another bot agent to identify a specific API and endpoint (e.g., see block 516 of FIG. 5). The question may be used to clarify an endpoint of the API and/or input parameters of the endpoints.

Figure 10:
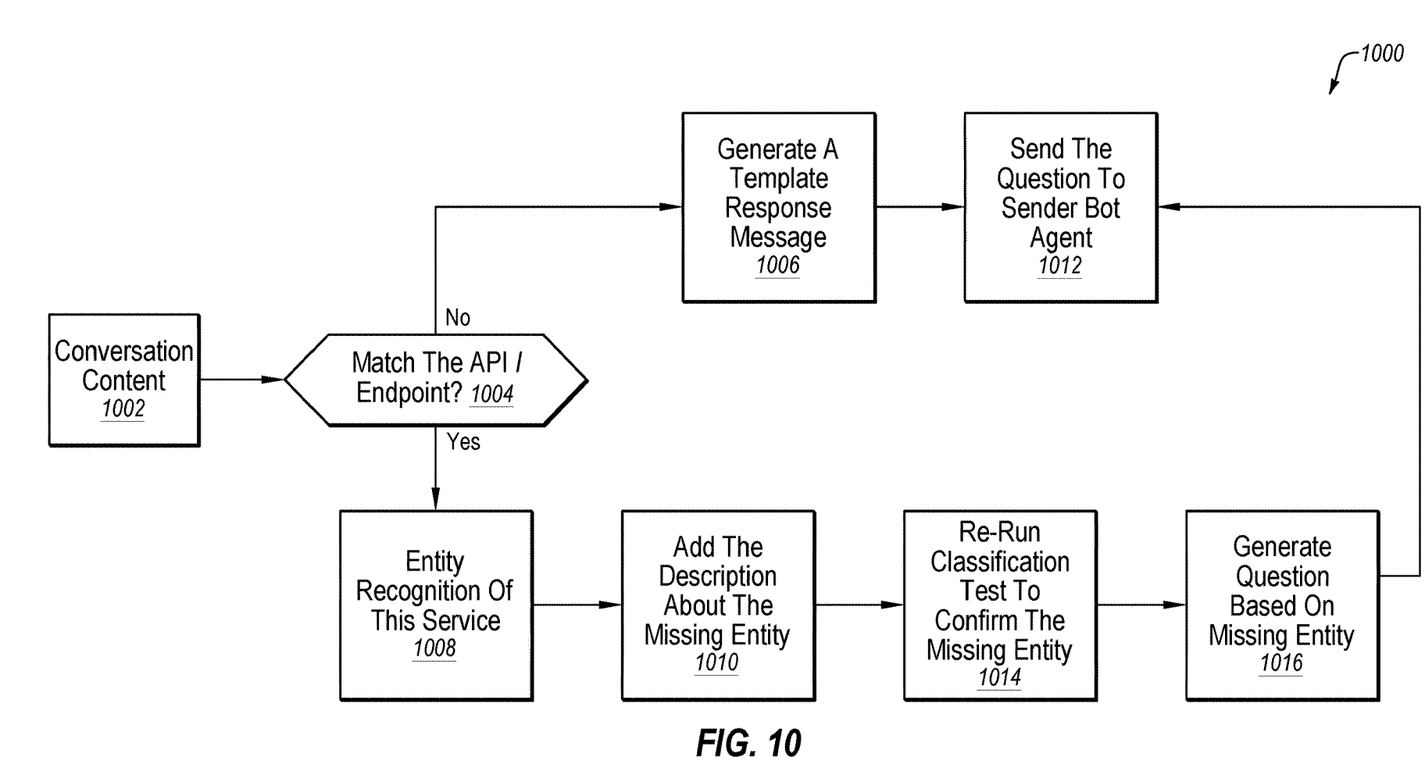
FIG. 10 illustrates an example flow that may be used to generate a message.

FIG. 10 depicts another example flow 1000 that may be used to generate a message to identify a specific API and endpoint, in accordance with one or more embodiments of the present disclosure, is shown. More specifically, flow 1000 is related to a testing phase of determining a bot agent. In some embodiments, one or more of the operations associated with flow 1000 may be performed by network 202. Alternately or additionally, flow 1000 may be performed by any suitable system, apparatus, or device. For example, processor 1110 of system 1100 of FIG. 11 may perform one or more of the operations associated with flow 1000. Although illustrated with discrete blocks, the steps and operations associated with one or more of the blocks of flow 1000 may be divided into additional blocks, combined into fewer blocks, or eliminated, depending on the desired implementation.

At block 1004, a determination may be made as to whether the received conversation content 1002 matches the API and/or an endpoint. If the received conversation content 1002 does not match the API and/or an endpoint (e.g., if the classification confidence of the top N results is low (e.g. below a threshold)), flow 1000 may proceed to block 1006. If the received conversation content matches the API and/or an endpoint, flow 1000 may proceed to block 1008. For example, a specialist bot agent may determine whether the conversation content 1002 matches the API and/or an endpoint.

At block 1006, the specialist bot agent may generate a template response message and send it back to the original requesting bot agent. The message may include the description of API and explanation of possible reasons of rejection.

At block 1008, the specialist agent may apply entity recognition to compare the conversation content with the required entities of the top N endpoint such as via similarity comparison of noun phases and the input parameters.

At block 1010, if a missing entity exists, a sample value of the missing entity may be accessed (e.g., from a built-in database), and a description about the missing entity may be added to the conversation content.

At block 1014, the classifier may be tested based on the newly updated content. If the difference in the increased classification confidence exceeds a threshold, the missing entity may be confirmed. At block 1016, a template question may be retrieved from the database based on the missing entity. At block 1012, a question may be sent to the sending bot agent.

Modifications, additions, or omissions may be made to flow 1000 without departing from the scope of the present disclosure. For example, the operations of flow 1000 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Example use cases for various embodiments of the present disclosure will now be discussed. As one example, various embodiments may provide a natural language interface for a service provider to interact with a front-end chatbot (e.g., Alexa or simply with a human over messenger). More specifically, a server provider may interact with a personal assistant. For example, in an online sales scenario, a server provider's bot agent may look for inventory and deals, help a customer find a product, offer a new deal based on customer experience, help a customer customize a product, etc. As another example, in a vehicle maintenance scenario, a virtual agent may communicate with dealer agents to, for example, match a personal schedule and dealers' schedules, offer troubleshooting services to customers, provide roadside assistant in emergency cases, and/or help customers diagnose vehicle problems.

In another example, various embodiments may be applicable to business-to-business bot communications. For example, in supply chain management (e.g., for manufacturers), bot agents may check the prices of raw materials, check the stock at retailers, and/or replace products by considering users requests (e.g., through chatbots). Further, for example, bots may provide analysis of users' requests and provide risk ratio for different products. For example, if there is several complaints about a product, a risk analyzer may provide a high-risk level for one or a group of products. Further, 24/7 chat bot agents, which are specialist in different topics, i.e., sales, customer service and service request, may be provided. Further, business-to-business bot communication may be used to receive and/or resolve users' inquiries.

In yet another example, various embodiments may have application in bot-to-bot communication. For example, a service provider (e.g. web service) may be associated with and/or include a chatbot, which may be configured to communicate with a user directly or through a front-end chatbot (e.g., Alexa™). In this embodiment, a user's own chatbot may be most familiar with the user's own service. Further, a bot may interact with different APIs to provide services. For example, a bot may call an API to answer a question from another bot.

Figure 11:
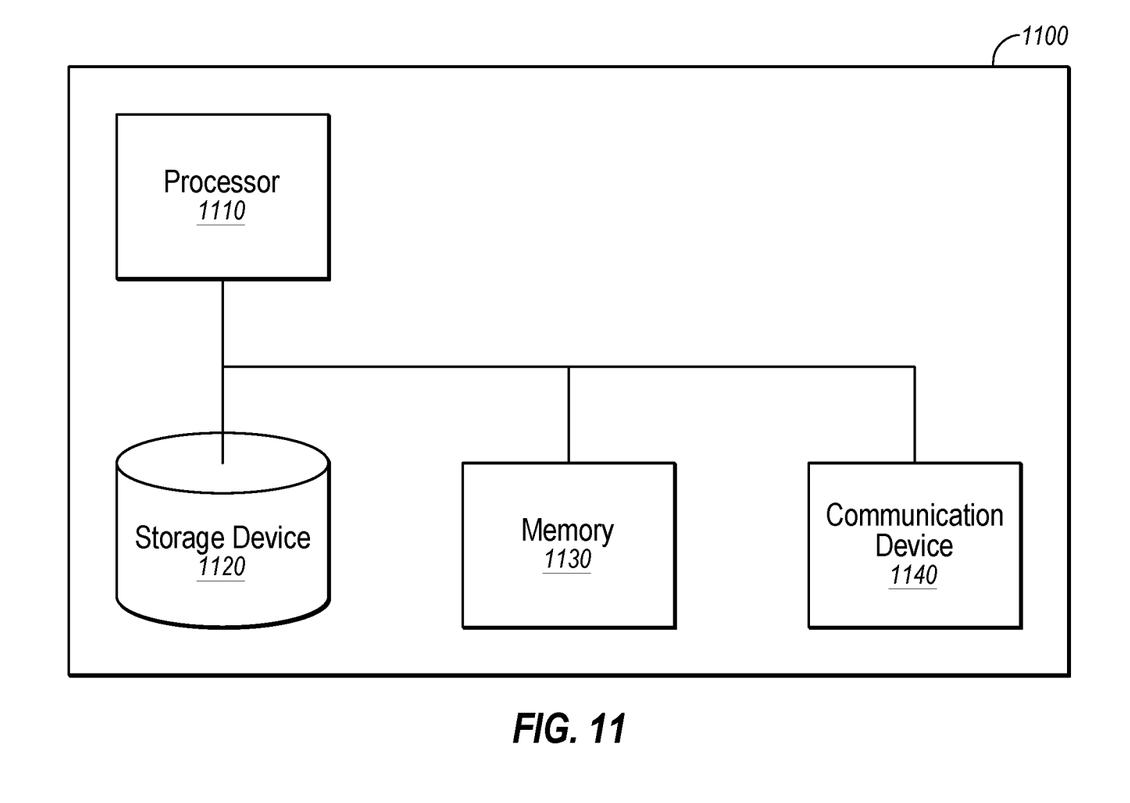
FIG. 11 is a block diagram of an example computing device.

FIG. 11 is a block diagram of an example computing device 1100, in accordance with at least one embodiment of the present disclosure. Computing device 1100 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 1100 may include a processor 1110, a storage device 1120, a memory 1130, and a communication device 1140. Processor 1110, storage device 1120, memory 1130, and/or communication device 1140 may all be communicatively coupled such that each of the components may communicate with the other components. Computing device 1100 may perform any of the operations described in the present disclosure.

In general, processor 1110 may include any suitable special-purpose or general-purpose computer, computing entity, or processing device including various computer hardware or software modules and may be configured to execute instructions stored on any applicable computer-readable storage media. For example, processor 1110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 11, processor 1110 may include any number of processors configured to perform, individually or collectively, any number of operations described in the present disclosure.

In some embodiments, processor 1110 may interpret and/or execute program instructions and/or process data stored in storage device 1120, memory 1130, or storage device 1120 and memory 1130. In some embodiments, processor 1110 may fetch program instructions from storage device 1120 and load the program instructions in memory 1130. After the program instructions are loaded into memory 1130, processor 1110 may execute the program instructions.

For example, in some embodiments one or more of processing operations for operating and/or training a bot network may be included in data storage 1120 as program instructions. Processor 1110 may fetch the program instructions of one or more of the processing operations and may load the program instructions of the processing operations in memory 1130. After the program instructions of the processing operations are loaded into memory 1130, processor 1110 may execute the program instructions such that computing device 1100 may implement the operations associated with the processing operations as directed by the program instructions.

Storage device 1120 and memory 1130 may include computer-readable storage media for carrying or having computer-executable instructions or data structures stored thereon. Such computer-readable storage media may include any available media that may be accessed by a general-purpose or special-purpose computer, such as processor 1110. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1110 to perform a certain operation or group of operations.

In some embodiments, storage device 1120 and/or memory 1130 may store data associated with bot networks, and more specifically, data associated with bot agents. For example, storage device 1120 and/or memory 1130 may store request data, response data, bot agent data, neural network data, neural networks (e.g., models), etc.

Communication device 1140 may include any device, system, component, or collection of components configured to allow or facilitate communication between computing device 1100 and another electronic device. For example, communication device 1140 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 1140 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 11 without departing from the scope of the present disclosure. For example, computing device 1100 may include more or fewer elements than those illustrated and described in the present disclosure. For example, computing device 1100 may include an integrated display device such as a screen of a tablet or mobile phone or may include an external monitor, a projector, a television, or other suitable display device that may be separate from and communicatively coupled to computing device 1100.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system, comprising:
    a plurality of bot agents, at least one bot agent of the plurality of bot agents configured to receive a user request from a user device in natural language and a plurality of candidate bot agents of the plurality of bot agents configured to obtains responses to the user request; and
    a plurality of digital resources including one or more of: a software program, a service, a web service, and a dataset, each digital resource of the plurality of digital resources configured to communicate with a dedicated bot agent of the plurality of candidate bot agents, each candidate bot agent including a trained machine learning model associated with the candidate bot agent and each candidate bot agent configured to:
        obtain previous user requests from one or more of the plurality of bot agents, the trained machine learning model associated with the candidate bot agent being trained using the previous user requests and the one or more of the plurality of bot agents from which the previous user requests are obtained not being included in the plurality of candidate bot agents configured to obtains responses to the user request;
        apply the user request to the trained machine learning model associated with the candidate bot agent to obtain a confidence score generated by the trained machine learning model regarding a match between the user request and the one of the plurality of digital resources corresponding to the candidate bot agent;
        provide the user request to the one of the plurality of digital resources corresponding to the candidate bot agent;
        obtain a response to the user request from the one of the plurality of digital resources corresponding to the candidate bot agent; and
        provide the response and the confidence score to the at least one bot agent,
    wherein the at least one bot agent is further configured to convey one of the responses from the plurality of candidate bot agents to the user device based on the confidence scores.

2. The system of claim 1, wherein each of the plurality of candidate bot agents are configured to translate between the natural language of the user request and a language of the corresponding one of the plurality of digital resources.

3. The system of claim 1, wherein the plurality of bot agents comprise a master bot agent for determining the plurality of candidate bot agents of the plurality of bot agents for handling the user request.

4. The system of claim 1, wherein at least one bot agent is configured to translate the one of the responses to the natural language of the user request.

5. The system of claim 1, wherein each bot agent of the plurality of bot agents is configured to exchange its state information with at least one other bot agent of the plurality of bot agents.

6. The system of claim 1, wherein at least one bot agent of the plurality of bot agents is configured to compare the user request to an API associated with each bot agent to select the plurality of candidate bot agents.

7. A method, comprising:
determining a plurality of candidate bot agents of a plurality of bot agents for responding to a user request from a user device in natural language, each of the plurality of candidate bot agents associated with a different one of a plurality of digital resources and each of the plurality of candidate bot agents including a trained machine learning model, each of the trained machine learning models configured to determine matching between requests and one of the plurality of digital resources;
obtaining, at one or more of the plurality of candidate bot agents, previous user requests from one or more of the plurality of bot agents, the trained machine learning models associated with the one or more of the plurality of candidate bot agents being trained using the previous user requests and the one or more of the plurality of bot agents from which the previous user requests are obtained not being included in the plurality of candidate bot agents for responding to the user request;
conveying, from each of the plurality of candidate bot agents to the corresponding one of the plurality of digital resources, the user request, each of the plurality of digital resources including one or more of: a software program, a service, a web service, and a dataset;
applying, by each of the plurality of candidate bot agents, the user request to their corresponding trained machine learning model configured to determine matching between requests and the one of the plurality of digital resources corresponding to each of the plurality of candidate bot agents;
receiving a plurality of responses from the plurality of digital resources;
selecting one of the plurality of responses as a selected response based on confidences output by the trained machine learning models; and
translating the selected response to the natural language; and
conveying the translated response to the user device.

8. The method of claim 7, further comprising receiving the user request from the user device in the natural language at a bot agent of the plurality of bot agents.

9. The method of claim 7, wherein determining the plurality of candidate bot agents comprises determining the plurality of candidate bot agents via a master bot agent.

10. The method of claim 7, further comprising routing conversation content from a bot agent of the plurality of bot agents to the plurality of candidate bot agents.

11. The method of claim 7, further comprising exchanging bot agent state information between two or more bot agents of the plurality of bot agents.

12. The method of claim 7, wherein determining the plurality of candidate bot agents comprises comparing the user request to an API associated with each of the plurality of bot agents.

13. One or more non-transitory computer-readable media that include instructions that, when executed by one or more processors, are configured to cause the one or more processors to perform operations, the operations comprising:
determining a plurality of candidate bot agents of a plurality of bot agents for responding to a user request from a user device in natural language, each of the plurality of candidate bot agents associated with a different one of a plurality of digital resources and each of the plurality of candidate bot agents including a trained machine learning model configured to determine matching between requests and one of the plurality of digital resources;
obtaining, at one or more of the plurality of candidate bot agents, previous user requests from one or more of the plurality of bot agents, the trained machine learning models associated with the one or more of the plurality of candidate bot agents being trained using the previous user requests and the one or more of the plurality of bot agents from which the previous user requests are obtained not being included in the plurality of candidate bot agents for responding to the user request;
conveying, from each of the plurality of candidate bot agents to the corresponding one of the plurality of digital resources, the user request, each of the plurality of digital resources including one or more of: a software program, a service, a web service, and a dataset;
applying, by each of the plurality of candidate bot agents, the user request to their corresponding trained machine learning model configured to determine matching between requests and the one of the plurality of digital resources corresponding to each of the plurality of candidate bot agents;
receiving a plurality of responses from the plurality of digital resources;
selecting one of the plurality of responses as a selected response based on confidences output by the trained machine learning models; and
translating the selected response to the natural language; and
conveying the translated response to the user device.

14. The computer-readable media of claim 13, the operations further comprising receiving the user request from the user device in the natural language at a bot agent of the plurality of bot agents.

15. The computer-readable media of claim 13, the operations further comprising exchanging bot agent state information between two or more bot agents of the plurality of bot agents.

16. The computer-readable media of claim 13, the operations further comprising routing conversation content from a bot agent of the plurality of bot agents to the plurality of candidate bot agents.

17. The computer-readable media of claim 13, wherein determining the plurality of candidate bot agents comprises comparing the user request an API associated with each of the plurality of bot agents.

* * * * *